Nov. 21, 1933.  C. C. BEALL  1,936,444
METHOD OF MAKING COMPOSITE PICTURES HAVING DUAL EFFECTS
Filed March 10, 1933    4 Sheets-Sheet 1

INVENTOR
CECIL C. BEALL
BY
ATTORNEYS

Nov. 21, 1933.  C. C. BEALL  1,936,444
METHOD OF MAKING COMPOSITE PICTURES HAVING DUAL EFFECTS
Filed March 10, 1933  4 Sheets-Sheet 2

INVENTOR
CECIL C. BEALL
BY
ATTORNEYS

Nov. 21, 1933.　　　　C. C. BEALL　　　　1,936,444
METHOD OF MAKING COMPOSITE PICTURES HAVING DUAL EFFECTS
Filed March 10, 1933　　4 Sheets-Sheet 3

INVENTOR
CECIL C. BEALL
BY
ATTORNEYS

Nov. 21, 1933. C. C. BEALL 1,936,444
METHOD OF MAKING COMPOSITE PICTURES HAVING DUAL EFFECTS
Filed March 10, 1933 4 Sheets-Sheet 4

INVENTOR
CECIL C. BEALL
BY
ATTORNEYS

Patented Nov. 21, 1933

1,936,444

UNITED STATES PATENT OFFICE 1,936,444

METHOD OF MAKING COMPOSITE PICTURES HAVING DUAL EFFECTS

Cecil C. Beall, Valhalla, N. Y., assignor of one-half to Cecil, Warwick & Cecil, New York, N. Y., a corporation of Virginia Application March 10, 1933. Serial No. 660,229

4 Claims. (Cl. 41—20)

This invention relates to improvements in the art of making composite pictures having dual effects and to the method of producing the same.

It is proposed, in accordance with the present invention, to produce pictures having dual effects which may be adapted to various uses such as for outdoor advertising on large billboards, window and counter displays, and covers for magazines and other periodicals, and wherein, through a series of successive steps the features of an original picture or drawing are submerged and then made to again predominate until a final dual picture is obtained which is at least partially composed of a number of minor elements or objects that appear to form different portions of a main or basic object when seen from a distance, but which, viewed at closer range, are actually of an entirely different nature than the portions of the basic object they represent.

The inventive idea involved is capable of receiving a variety of expressions, one of which, for purposes of illustration, is shown in the accompanying drawings wherein:—

Figure 2:
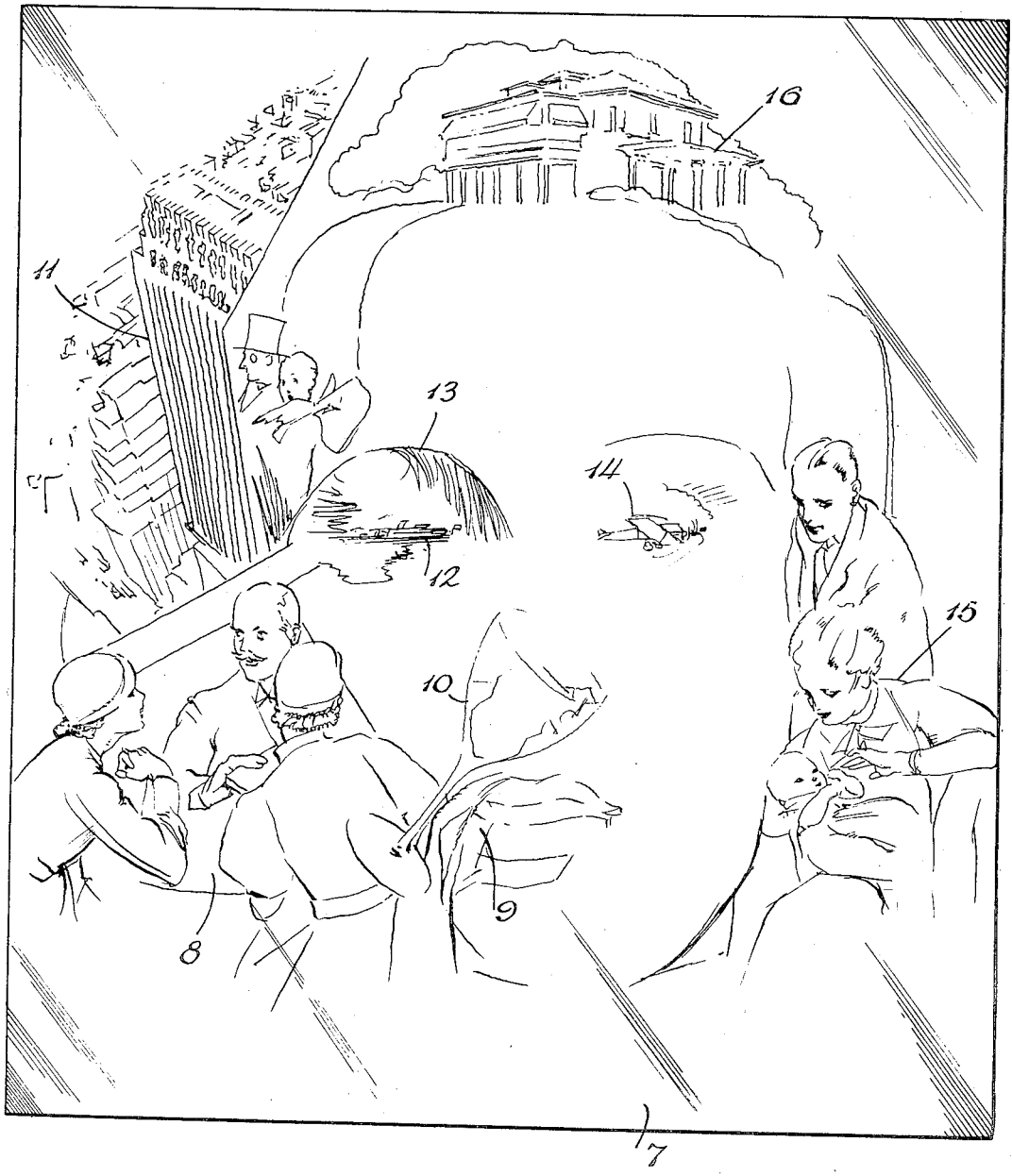
Figure 2 is a similar view of a sheet of transparent paper having thereon a series of minor elements which are drawn in outline on said sheet while it is superimposed upon the sheet of Figure 1, and which are sketched to at least partially conform to the contour and be within the confines of portions of the basic picture or object.
Figure 3:
Figure 4:

Figure 3 is a similar view of another sheet of transparent paper upon which is illustrated, while the sheet is superimposed upon the sheet shown in Figure 2, the various values such as the masses of light and shadow of the original drawing, and Figure 4 is a plan view of still another transparent sheet on which is combined or merged the minor elements of Figure 2 and the values of Figure 3 to form the composite picture which has a semblance of the basic object, and wherein said minor elements are predominant when the picture is viewed at close range.

In making a picture in accordance with the present invention, the artist is given a basic object to be illustrated which, in the composite picture, will be the predominant thing seen when the picture is viewed from a distance. However, various portions of this basic object are actually composed of a series of subordinate or minor elements each so arranged in the picture as to simulate some portion of said basic object when seen from afar, but each actually illustrating an entirely different object than the portion which it is designed to represent when the picture is viewed in its entirety. Said minor elements may be illustrative of a group of facts or incidents, correlated or otherwise, appearing in a written article or narrative; may depict certain events; or they may be symbolic character representations. In fact, these minor elements may be of any nature or form; it being understood that the invention is not to be construed as limited to the use of any particular group of elements nor to the thoughts or ideas which they are intended to convey.

The specific embodiment of the invention shown in the accompanying drawings is designed to illustrate a story involving a young lady of wealthy parentage who is confronted with the problem of making a choice between a life spent in a large metropolis where she could attend the opera and cocktail parties with her father and his lady friends, and take a tropical honeymoon cruise in his private yacht, or, on the other hand, board an aeroplane and fly toward the setting sun to the man she loves and desires to marry and who will make a home for her on the hill in the country.

In carrying out the invention, there is prepared on the sheet 5 an original drawing of the basic object which, in the present instance, is the head 6 of the young lady whose features will be simulated in the final or composite picture. When this original drawing has been completed a sheet of transparent paper 7 (Figure 2) is superimposed upon the sheet 5 and then, with regard to the various features of the head 6 and the location thereof which are visible through said sheet 7, there is sketched, in outline only, the series of preconceived minor elements which are so prepared so as to conform at least partially to the contour and come substantially within the confines of the portions of the head which said elements will simulate when viewed from a distance. Thus, the group 8 at the lower left hand corner in Figure 2, consisting of a gentleman and two ladies sitting at a table partially outlines the left hand cheek line and part of the hair and is designed to ultimately form in the composite picture the masses and shadows of said portion of the hair; a part of a coat 9 flung over the back of a chair in which one of the young ladies is sitting is employed to form the mouth; and a portion of cocktail glass 10 is used as a basis for later forming the nose. Further, above the group 8 there is sketched another group 11 including the representation of skyscrapers and a lady and gentleman in evening clothes attending the opera, and this group is later utilized to constitute a further portion of the hair masses and to outline the same and the left hand temple. Adjacent the latter group is the representation of a yacht 12 over which is bowed a palm leaf 13, these latter elements being designed to simulate an eye, and the eyebrow and its shadows, respectively; and the other or right hand eye is formed by the representation of an aeroplane 14 flying toward the setting sun. The right hand temple, cheek line and adjacent portion of the hair is substantially outlined by the group 15 representing a happy family and finally the top portion of the hair and forehead line are partially outlined by the picture of the house 16 which also forms the mass of hair at this point. In this completed drawing the features of the original illustration are submerged and the various minor elements form the predominating characteristics.

Figure 1:
Figure 1 is a plan view of a sheet containing thereon a picture which may be an original drawing of the basic or main object of which the ultimate composite picture will be a simulation.

Having now grouped a series of minor elements in such manner that the same may be utilized to simulate, in the dual picture, definite features of the original or basic object, it is now necessary to restore the prominence of said features. This may be done by a step in the method illustrated in Figure 3. In this step, a sheet of transparent paper 17 is laid upon the sheet 7 and there is then traced upon the former sheet the masses of light and shadow of the original drawing 6 which are visible through said sheet 7. The arrangement of the light and shade values on sheet 17 is influenced by the elements on sheet 7 and is made insofar as possible, to conform to the corresponding arrangement of said values on sheet 5. In the production of sheet 17, the values thereon are transparent so that the outlines of the minor elements on sheet 7 are easily visible through the dark masses on the former sheet. This transparency, in actual practice, is achieved by the use of powdered charcoal or graphite applied in any manner known in the art. The purpose of the present step is to intensify the values of the masses of light and shadow of the basic object 6 so as to facilitate the making of the succeeding step shown in Figure 4. However, it is possible to produce the drawing of the latter figure without the aid of Figure 3, provided that the sheet of tracing paper 7 used to make Figure 2 is sufficiently transparent to permit of the values of Figure 1 being clearly discernible through said sheet.

Upon completion of Figure 3, a sheet of transparent paper 18 is superimposed upon the sheet 17 and the artist then proceeds to make the final sketch in which a semblance of the basic object is incorporated in such a manner that the same is made the predominant feature of the dual picture when it is viewed from a distance. In accomplishing this result, a merger of the illustrations of Figures 2 and 3 is effected in which the minor elements 8 to 16 are completed as distinguished from their outline form shown in Figure 2, and the masses of light and shade in Figure 3 are traced to create the simulation of the basic object.

In many instances it is desirable to make pictures in color, such as in display advertising, magazine covers, etc. To do this, the color of the minor elements shown in Figure 2 must conform to the natural colors of the various portions of Figure 1 with which said elements are associated. For instance, the house and the skyscrapers are made in any natural hair color; the coat 9 over the back of the chair would be red to simulate the color of the lips; and the color of the cocktail glass 10 that is used to define the nose would be the color of a shadow cast on flesh by a nose. To thus make the colored picture a photostat is prepared from Figure 4 and made to a size most easily accommodated to painting. This photostat is then, by means of carbon transfer paper, traced or transferred to a sheet of water color board or canvas. The color is then applied as would be done in the making of a color picture from a black and white subject.

What is claimed is:

1. The method of producing a composite picture having a dual effect which consists in transforming, through a series of successive steps, an original drawing showing a basic object so that in certain of said steps the features of said object are submerged and those of other minor objects which are simulations of, but have entirely different characteristics from portions of said basic object, are made to predominate, and wherein, in certain other steps, said minor objects are retained and so merged with the features of the basic object that the latter will again predominate when the picture is viewed from a distance.

2. The method of making a composite picture having a dual effect which comprises placing a sheet of tracing paper upon an original drawing the simulation of which is to form the basic object of the composite picture, drawing upon said sheet a series of minor elements each of which is substantially superimposed upon and conforms at least partially to the contour of a portion of said original drawing, but which is representative of a different object from that portion upon which it is superimposed, and then, upon a second sheet of tracing paper superimposed upon the first sheet, merging certain values of the original drawing and the minor elements on the last named sheet to form a semblance of the object upon said original drawing.

3. The method of making a composite picture having a dual effect which comprises placing a sheet of tracing paper upon an original drawing the simulation of which is to form the basic object of the composite picture, drawing upon said sheet a series of minor elements each of which is substantially superimposed upon and conforms at least partially to the contour of a portion of said original drawing, but which is representative of a different object from that portion upon which it is superimposed, superimposing upon the first named sheet a second sheet of transparent paper and tracing thereon certain values of said original drawing which are visible through said first sheet, and then, upon a third sheet of tracing paper superimposed upon said second sheet, merging said values and the minor elements on the latter sheet to form an object which will appear as a reproduction of the original drawing when viewed from a distance but which upon closer inspection will reveal the original identity of the minor elements on said first sheet.

4. The method of making a composite picture having a dual effect which comprises drawing in outline upon a sheet of transparent paper superimposed upon an original drawing a plurality of minor elements each of which is superimposed upon a portion of said original drawing and conforms at least partially to the contour of said portion, but which is representative of a different object from that portion upon which it is superimposed, then, upon a second sheet of transparent paper superimposed, merging certain values of the original drawing with said minor elements, and completing the latter as distinguished from their original outline form so as to produce a composite picture which, when viewed from a distance, appears as a reproduction of said original drawing.

CECIL C. BEALL.